(12) United States Patent
Bagepalli

(10) Patent No.: US 8,307,593 B2
(45) Date of Patent: Nov. 13, 2012

(54) TOWER WITH ADAPTER SECTION

(75) Inventor: Bharat Sampathkumaran Bagepalli, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 126 days.

(21) Appl. No.: 12/858,716

(22) Filed: Aug. 18, 2010

(65) Prior Publication Data
US 2011/0138707 A1 Jun. 16, 2011

(51) Int. Cl.
E04C 5/08 (2006.01)
(52) U.S. Cl. ............ 52/223.5; 52/40; 52/223.3; 52/79.4
(58) Field of Classification Search .................... 52/79.4, 52/836, 745.04, 223.3, 223.5, 40
See application file for complete search history.

(56) References Cited

U.S. PATENT DOCUMENTS

| | | | |
|---|---|---|---|
| 4,522,564 A | 6/1985 | Carter, Jr. et al. | |
| 6,318,034 B1 * | 11/2001 | Zavitz et al. | 52/194 |
| 6,851,231 B2 * | 2/2005 | Tadros et al. | 52/223.4 |
| 7,105,940 B2 | 9/2006 | Weesner et al. | |
| 7,160,085 B2 | 1/2007 | de Roest | |
| 7,739,843 B2 | 6/2010 | Cortina-Cordero | |
| 7,877,944 B2 * | 2/2011 | Seidel | 52/296 |
| 7,900,406 B2 * | 3/2011 | Wobben | 52/126.1 |
| 2005/0218657 A1 | 10/2005 | Weesner et al. | |
| 2006/0156681 A1 | 7/2006 | Fernandez Gomez et al. | |
| 2008/0040983 A1 | 2/2008 | Fernandez Gomez et al. | |
| 2009/0031639 A1 | 2/2009 | Cortina/Cordero | |
| 2010/0005742 A1 | 1/2010 | Puigcorbe Punzano et al. | |
| 2011/0138704 A1 * | 6/2011 | Bagepalli et al. | 52/147 |

FOREIGN PATENT DOCUMENTS

EP 1262614 B1 9/2008

* cited by examiner

Primary Examiner — Branon Painter
(74) Attorney, Agent, or Firm — James W. Pemrick; Ernest G. Cusick; Frank A. Landgraff

(57) ABSTRACT

A tower is provided having a foundation, at least one concrete tower section located above the foundation and one or more upper tower sections. An adapter section is located between the concrete tower section and one of the upper tower sections. The adapter section is connected to one of the upper tower sections by a fastening system and to the foundation by a plurality of tensioning cables, which are configured to induce a compressive force on the concrete tower section. The fastening system and the plurality of tensioning cables are substantially vertically aligned so that tower loads are transmitted from the upper tower sections to the plurality of tensioning cables.

13 Claims, 8 Drawing Sheets

TOWER WITH ADAPTER SECTION

BACKGROUND OF THE INVENTION

This invention relates generally to towers. In particular, but not limited thereto, the present invention relates to wind turbine towers having an adapter between steel and concrete sections.

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

Several technical installations require a tower or a mast to which the installation is mounted. Non-limiting examples of such installations are wind turbines, antenna towers used in broadcasting or mobile telecommunication, pylons used in bridge work, or power poles. Typically, the tower is made of steel and must be connected to a foundation made of reinforced concrete. In these cases, the typical technical solution is to provide a large, solid reinforced concrete foundation at the bottom of the tower. In typical applications the tower foundation extends about 12 meters below the ground level, and can be about 18 meters or more in diameter.

In larger utility grade wind turbines (e.g., 2.5 MW or more) it is often desired to have towers with heights of 80 meters or more. The higher hub heights provided by larger towers enable the wind turbine's rotor to exist in higher mean wind speed areas, and this results in increased energy production. Increases in tower height invariably have lead to corresponding increases in the mass, length and diameter of the tower. However, it becomes difficult to construct and transport large wind turbine towers as the local transportation infrastructure (e.g., roads, bridges, vehicles, etc.) often impose limits on the length, weight and diameter of tower components.

BRIEF DESCRIPTION OF THE INVENTION

According to one aspect of the present invention, a tower is provided having a foundation, at least one concrete tower section located above the foundation and one or more upper tower sections. An adapter section is located between the at least one concrete tower section and one of the upper tower sections. The adapter section is connected to one of the upper tower sections by a fastening system and to the foundation by a plurality of tensioning cables. The plurality of tensioning cables are configured to induce a compressive force on the concrete tower section. The fastening system and the tensioning cables are substantially vertically aligned so that tower loads are transmitted from the one or more upper tower sections to the plurality of tensioning cables.

According to another aspect of the present invention, a wind turbine having a tower is provided. The tower includes a foundation, at least one concrete tower section located above the foundation and one or more upper tower sections. An adapter section is located between the concrete tower section and one of the upper tower sections. The adapter section is connected to one of the upper tower sections by a fastening system and to the foundation by a plurality of tensioning cables. The tensioning cables are configured to induce a compressive force on the concrete tower section. The fastening system and the plurality of tensioning cables are substantially vertically aligned so that tower loads are transmitted from the upper tower sections to the tensioning cables.

DETAILED DESCRIPTION OF THE INVENTION

Reference will now be made in detail to the various aspects of the invention, one or more examples of which are illustrated in the figures. Each example is provided by way of explanation of the invention, and is not meant as a limitation of the invention. For example, features illustrated or described as part of one aspect can be used on or in conjunction with other aspects to yield yet a further aspect. It is intended that the present invention includes such modifications and variations.

Figure 1:
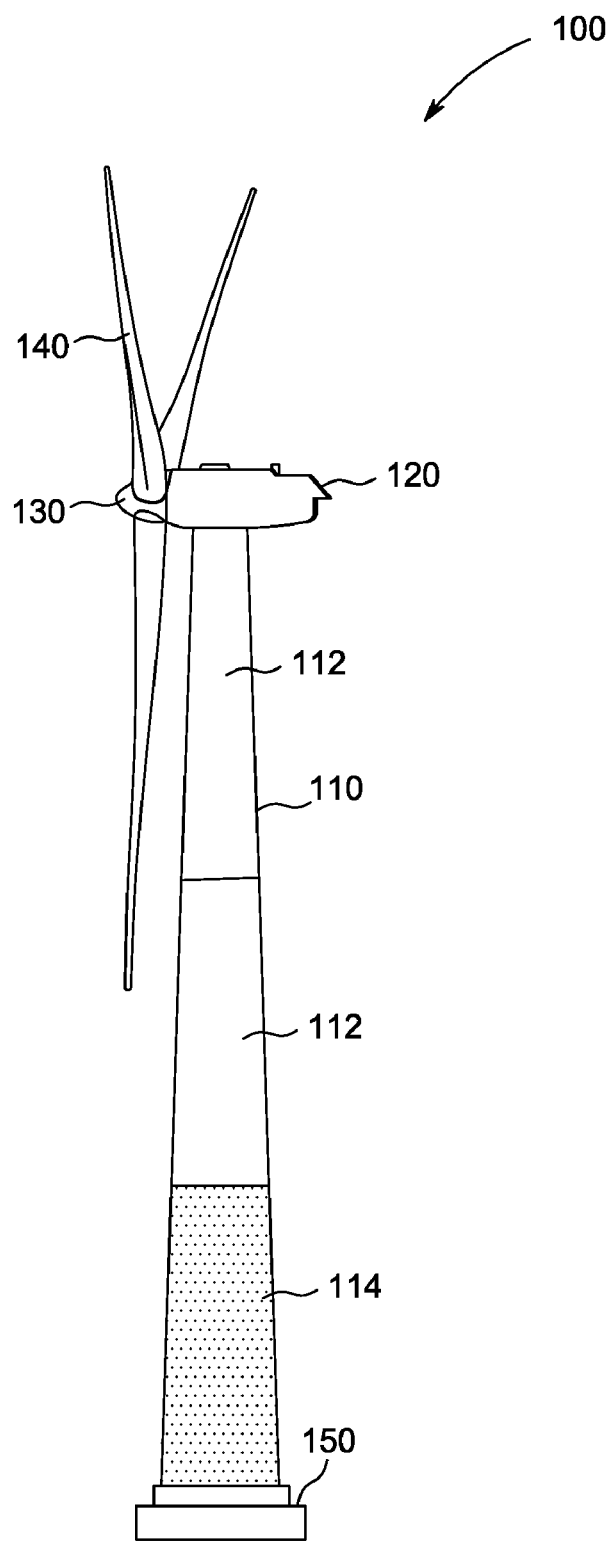
FIG. 1 illustrates one exemplary wind turbine having a concrete tower section.

FIG. 1 shows a wind turbine to which the aspects of the present invention can be advantageously applied. However, it should be understood that the present invention is not limited or restricted to wind turbines but can also be applied to tower structures used in other technical fields. In particular, the various aspects of the present invention may also be applied to antenna towers used in broadcasting or mobile telecommunication or to pylons used in bridge work. Therefore, although the aspects of the invention will be exemplified with reference to a wind turbine, the scope of the present invention shall not be limited thereto.

The wind turbine 100 shown in FIG. 1 comprises one known tower 110 bearing a nacelle 120 on its top end. A rotor including a rotor hub 130 and rotor blades 140 is attached to one side of the nacelle 120. The tower 110 is mounted on a foundation 150. The tower may have multiple stacked sections 112 be formed of rolled steel and a bottom section 114 formed of concrete. Typically, the tower foundation 150 is made of a solid mass of reinforced concrete.

It has been difficult to attach the upper tower sections 112 to the lower concrete section 114. Specifically, the loads transmitted from the upper sections 112 to the lower section 114 can include a mixture of tensile and compressive forces. The tensile forces in particular may cause cracking or fractures in parts of the tower 110.

It would be advantageous to increase tower height in order to capture more energy due to higher mean wind speeds. An aspect of the present invention provides a tower, tower section or adapter fabricated, at least partially, from concrete. A concrete base section can be used to elevate a conventional rolled-steel tower, or the entire tower can be formed of concrete. The rolled-steel portion could also be replaced by a lattice or truss type tower. Concrete is defined as a mixture of aggregates and binder or any suitable masonry support. As one non-limiting example only, the aggregates may be sand and gravel or crushed stone, and the binder may be water and cement.

While concrete is strong in compression, it is weak in tension. Steel is strong under forces of tension, so combining the two elements results in the creation of very strong concrete components. In conventional reinforced concrete, the high tensile strength of steel is combined with concrete's great compressive strength to form a structural material that is strong in both compression and tension. The principle behind prestressed concrete is that compressive stresses induced by high-strength steel tendons in a concrete member before loads are applied will balance the tensile stresses imposed in the member during service.

Compressive stresses can be induced in prestressed concrete either by pretensioning or post-tensioning the steel reinforcement. In pretensioning, the steel is stretched before the concrete is placed. High-strength steel tendons or cables are placed between two abutments and stretched to a portion of their ultimate strength. Concrete is poured into molds around the tendons/cables and allowed to cure. Once the concrete reaches the required strength, the stretching forces are released. As the steel reacts to regain its original length, the tensile stresses are translated into a compressive stress in the concrete.

In post-tensioning, the steel or cable is stretched after the concrete hardens. Concrete is cast in the desired shape first. Once the concrete has hardened to the required strength, the steel tendons or cables are attached and stretched against the ends of the unit and anchored off externally, placing the concrete into compression. According to one aspect of the present invention, post-tensioned concrete is used for wind turbine towers, wind turbine tower sections or adapters between tower sections.

Figure 2:
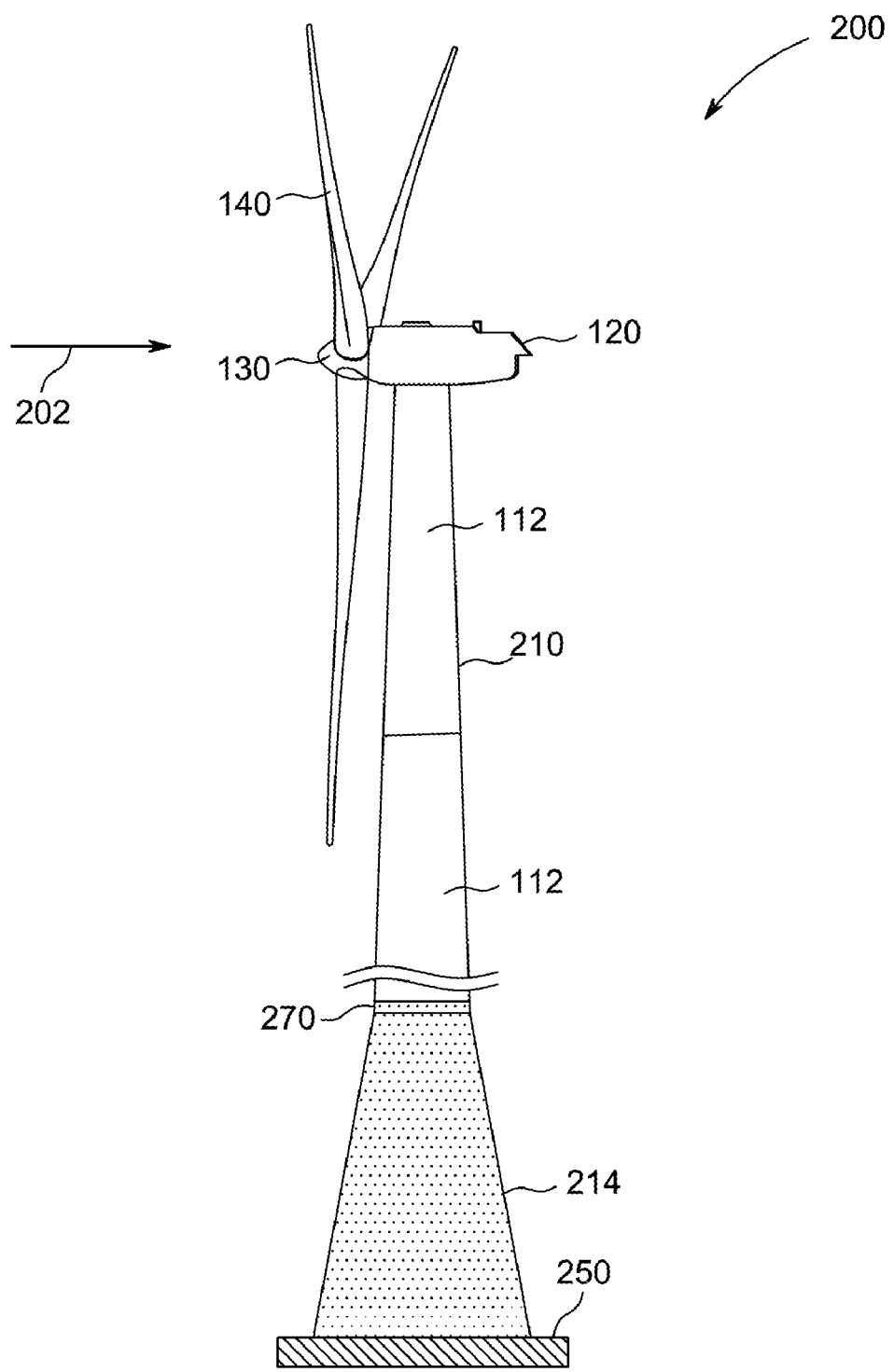
FIG. 2 illustrates a side view of a wind turbine and wind turbine tower, according to an aspect of the present invention.

FIG. 2 illustrates a wind turbine tower, according to an aspect of the present invention. The wind turbine 200 includes a tower 210 which may include one or more sections 112. The tower sections 112 may be formed of rolled steel. A concrete tower section 214 is located at the bottom of the tower and supports the upper sections 112. The concrete tower section 214 may be formed in one or more sections and have a tapered (as shown) or cylindrical shape. Alternatively, the tower sections 210 and/or 214 can have any desired cross-section, such as but not limited to, oval, rectangular, polygonal, etc.

An adapter section 270 can be used to join an upper section 112 to the lower concrete section 214. The adapter section 270 may comprise a pre-cast member in the shape or a slab, ring or cylinder. The adapter section 270 may also have any suitable shape as desired in the specific application. The adapter section 270 is configured to substantially align the tower load forces so tensile and shear forces are reduced, as will be further discussed below.

Figure 3:
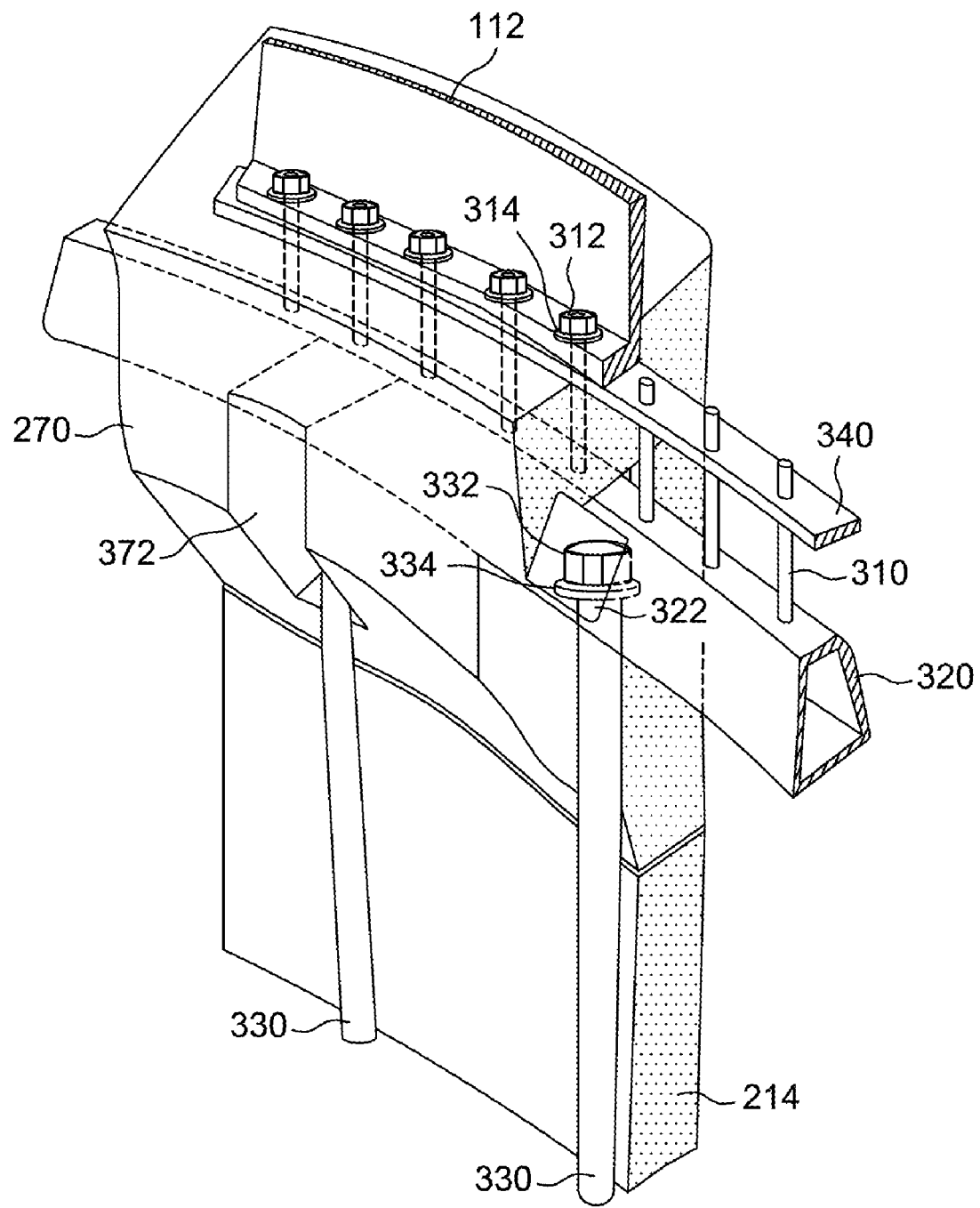
FIG. 3 illustrates a perspective view of an adapter section, according to an aspect of the present invention.

FIG. 3 illustrates a partial perspective view of the adapter section 270 that may be used between upper section 112 and concrete section 214, according to an aspect of the present invention. The adapter section 270 may be formed of pre-cast concrete that is molded around a set of tower bolts 310 and a link ring 320. The tower bolts 310 may be secured to the link ring 320 by welding, fasteners or any other suitable means.

The link ring 320 may be a substantially hollow member, a substantially solid member or may have solid sections, and may have any suitable cross-sectional profile, including but not limited to, trapezoidal (as shown), polygonal, cylindrical, I-shaped, oval or rectangular.

A plurality of tensioning cables 330 can be secured at one end to the link ring 320 and at the other end to foundation 250. A plurality of access ports 372 may be provided in adapter 270 and are used to access windows 322 in link ring 320. Both the access ports 372 and windows 322 are circumferentially located around the adapter 270 and link ring 320, respectively. The link ring 320 includes a plurality of holes through which the cables 330 can be threaded. In one aspect of the invention, the upper ends of cables 330 can be threaded so that the cables can be secured to the link ring 320 with a suitable fastening arrangement. For example, a nut 332 and washer 334 could be used to secure the ends of cables 330 to link ring 320. The access ports 372 and windows 322 permits access to the upper ends of cables 330 and the fastening means.

A bolt plate 340 may be placed on top of adapter 270 and includes a plurality of holes through which tower bolts 310 pass. The upper section 112, includes a similar plurality of holes in a flange, and is placed on top of the bolt plate 340. The upped ends of the tower bolts 310 can be threaded so that the upper section can be secured to the adapter 270 by the use of suitable fasteners (e.g., nuts 312 and washers 314). However, any suitable fastening system may be used as desired in the specific application.

The tensioning cables 330 are located circumferentially around the concrete section 214, and may be positioned close to and at a substantially uniform distance from an outer or exterior surface of concrete section 214. The term "substantially uniform" can be defined as having approximately the same, or having a slightly varying distance (e.g., a slight taper). In other words, the tensioning cables 330 can be parallel to or nearly parallel to the outer or inner surface of concrete section 214. As one non-limiting example only, the tensioning cables 330 may be spaced from an exterior or interior surface of a top portion of concrete section 214 by about two to twelve inches, whereas the cables 330 may be spaced from an exterior or interior surface of a bottom portion of concrete section 214 by about six to eighteen inches.

The cables 330 can be of the post-tensioned type, and they apply a compressive force to the walls of concrete section 214. The use of external cables may result in a larger moment arm and lower cable forces, and eventually, smaller cables might be required when compared to using the cables internal to the concrete segment. In other aspects of the invention, the tensioning cables 330 are positioned close to an exterior or interior surface of concrete section 214, but may be configured to have a slightly increasing or slightly decreasing distance from the exterior or interior surface of concrete section 214.

During operation of the wind turbine 200, wind flows in the direction indicated by arrow 202. The force of the wind creates a load on the wind turbine and tower. The up-wind side of the tower (i.e., the left side of the tower as shown in FIG. 2) would be under tension, while the down-wind side of the tower (i.e., the right side of the tower as shown in FIG. 2) would be under compression. As discussed previously, concrete performs very well under compression. However, concrete does not perform as well under tension. The tensioning cables 330 help to counteract the wind caused forces of tension on the tower section 214.

Figure 4:
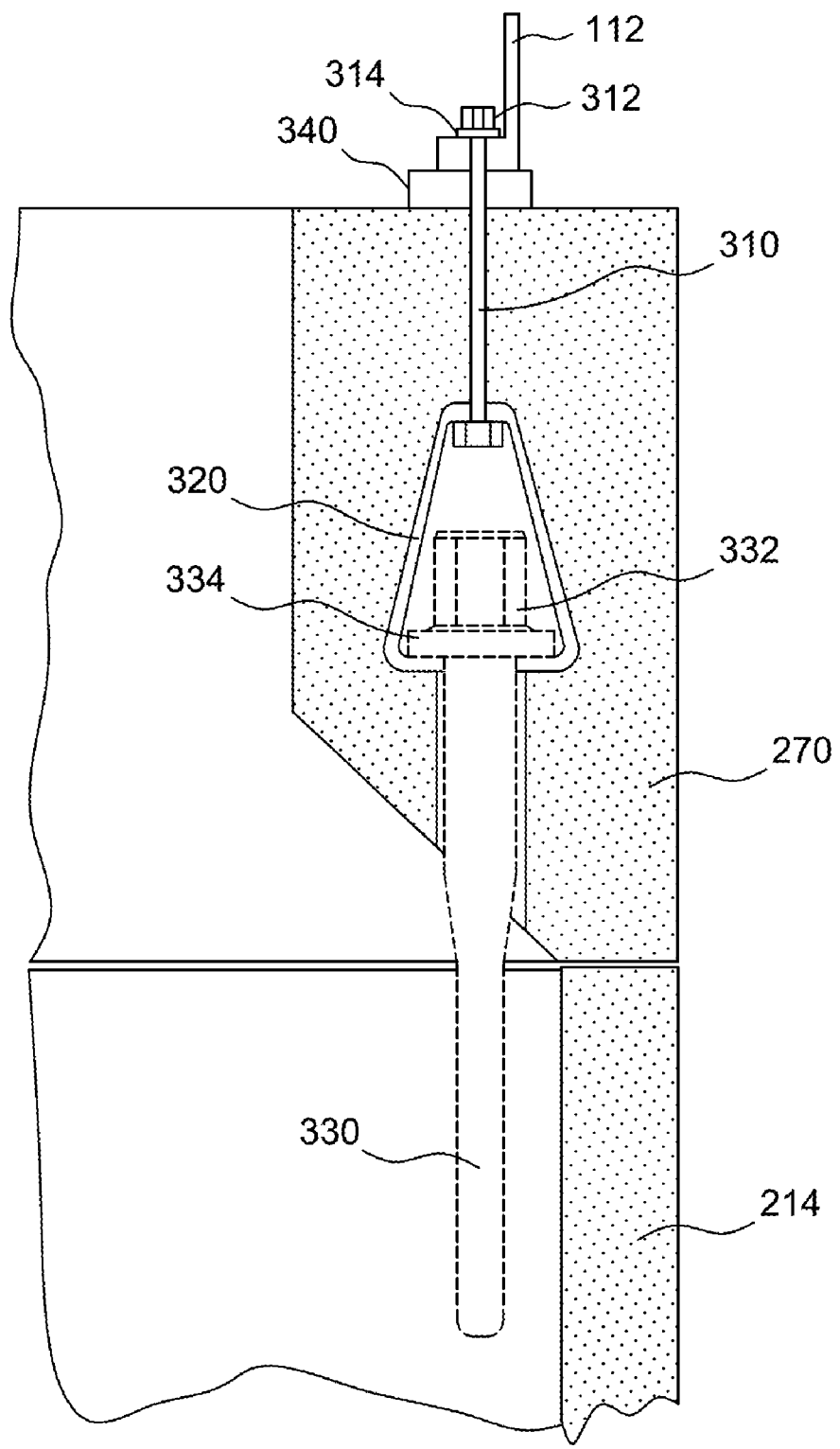
FIG. 4 illustrates a cross-sectional view of the adapter section of FIG. 3, according to an aspect of the present invention.
Figure 5:
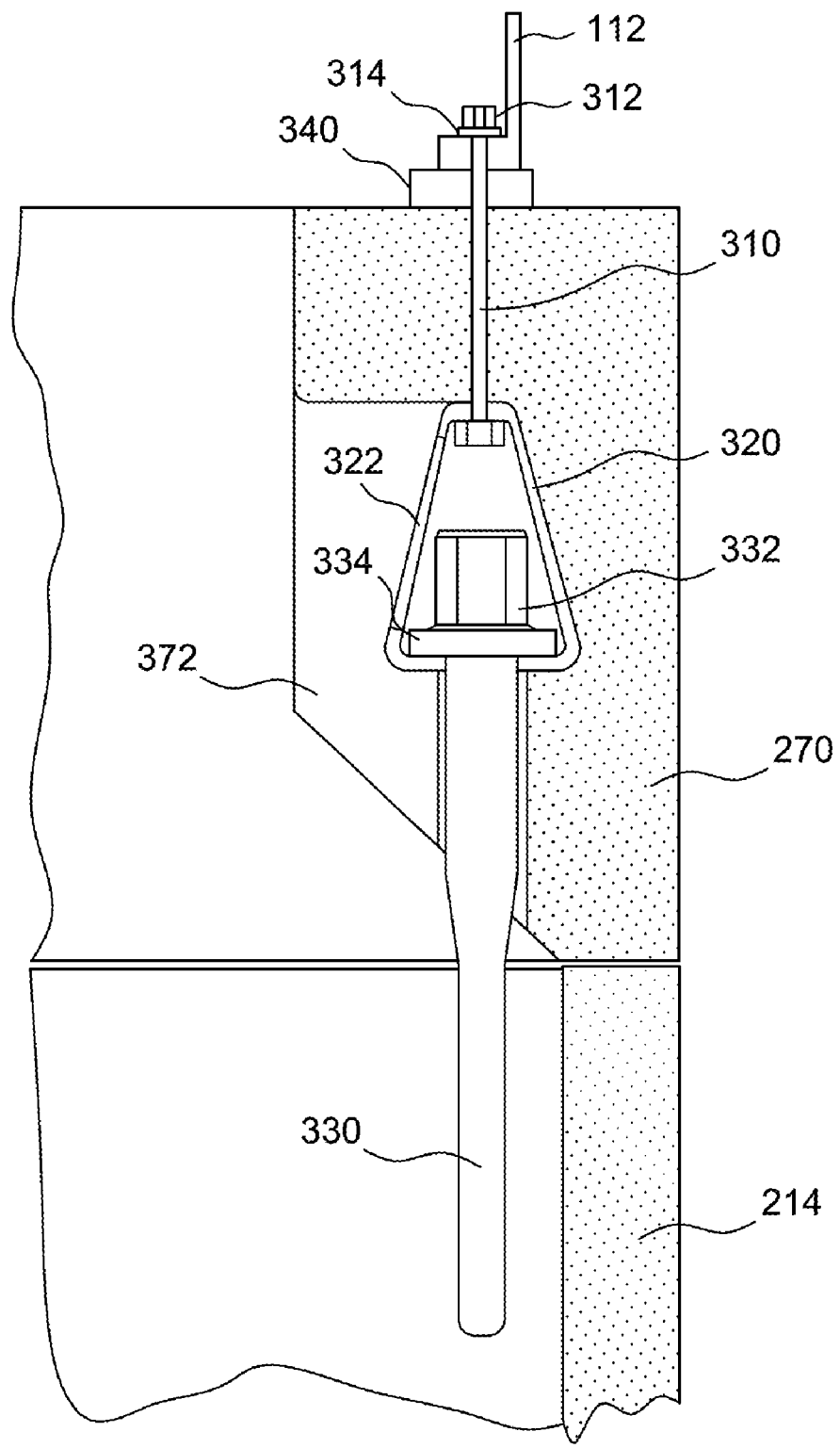
FIG. 5 illustrates another cross-sectional view of the adapter section of FIG. 3, according to an aspect of the present invention.

FIG. 4 illustrates a cross-sectional view of the adapter 270. The tower bolts 310 and the cables 330 are aligned in the vertical direction so that any tensile loads originating from the tower bolts 310 are directly transmitted, via link ring 320, to the cables 330. This arrangement reduces any shear or tensile loads, and any subsequent cracking, experienced by the concrete in adapter 270. The vertically aligned tower bolts 310 and cables 330 are one aspect of the present invention. FIG. 5 illustrates a cross-sectional view of the adapter 270 showing the window 322 in link ring 320 and the access port 372 in adapter 270.

Figure 6:
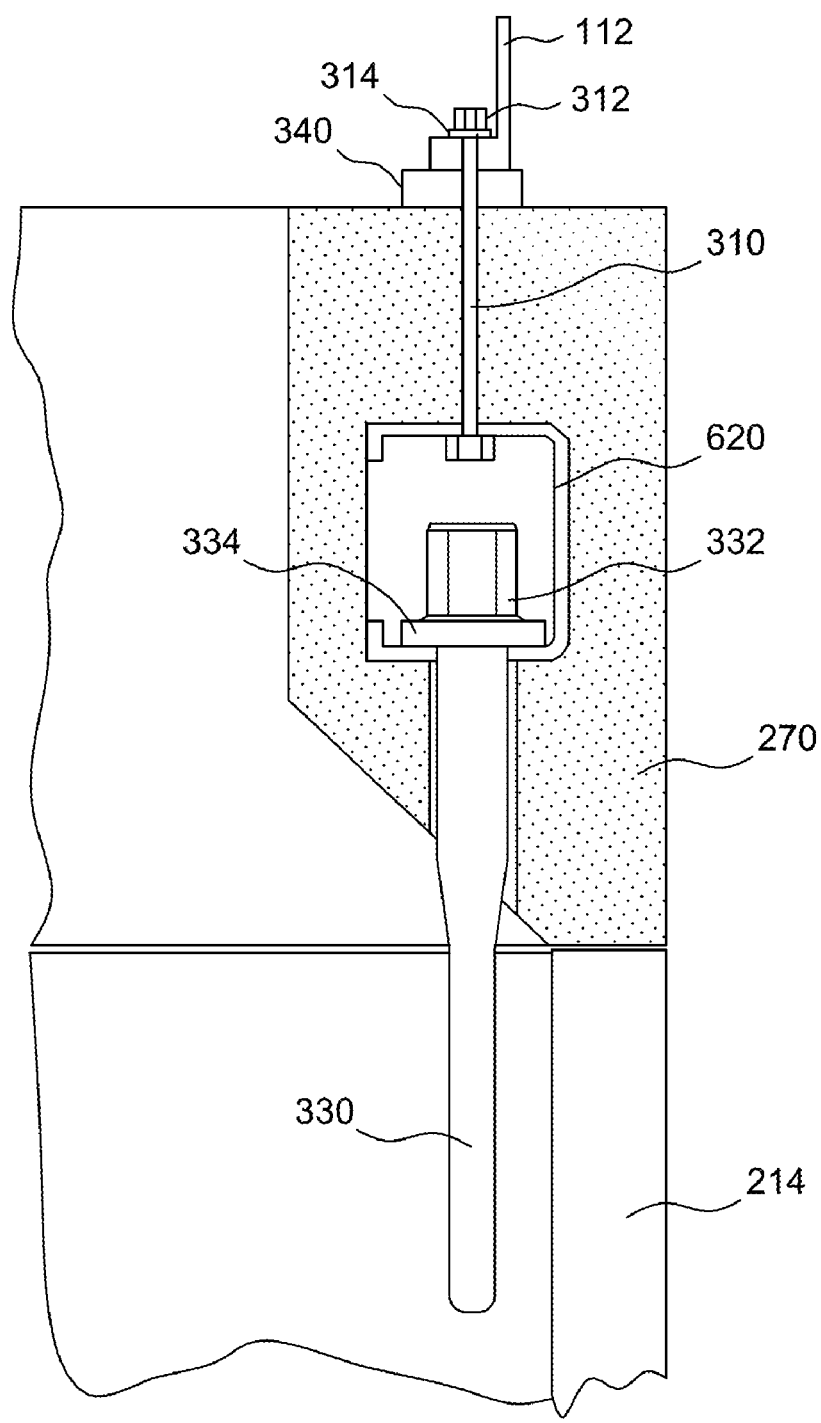
FIG. 6 illustrates a cross-sectional view of an adapter section, according to an aspect of the present invention.

FIG. 6 illustrates a cross-sectional view of the adapter 270, according to another aspect of the present invention. The link ring 620 may have a generally C-shaped cross-section profile. This arrangement may facilitate access and placement of the tensioning cables 330 and their associated fastening means. The access ports 372 may be used to access the open portion of the C-shaped link ring 620. The vertically aligned tower bolts 310 and cables 330 reduce any shear or tensile loads, and any subsequent cracking, experienced by the concrete in adapter 270.

Figure 7:
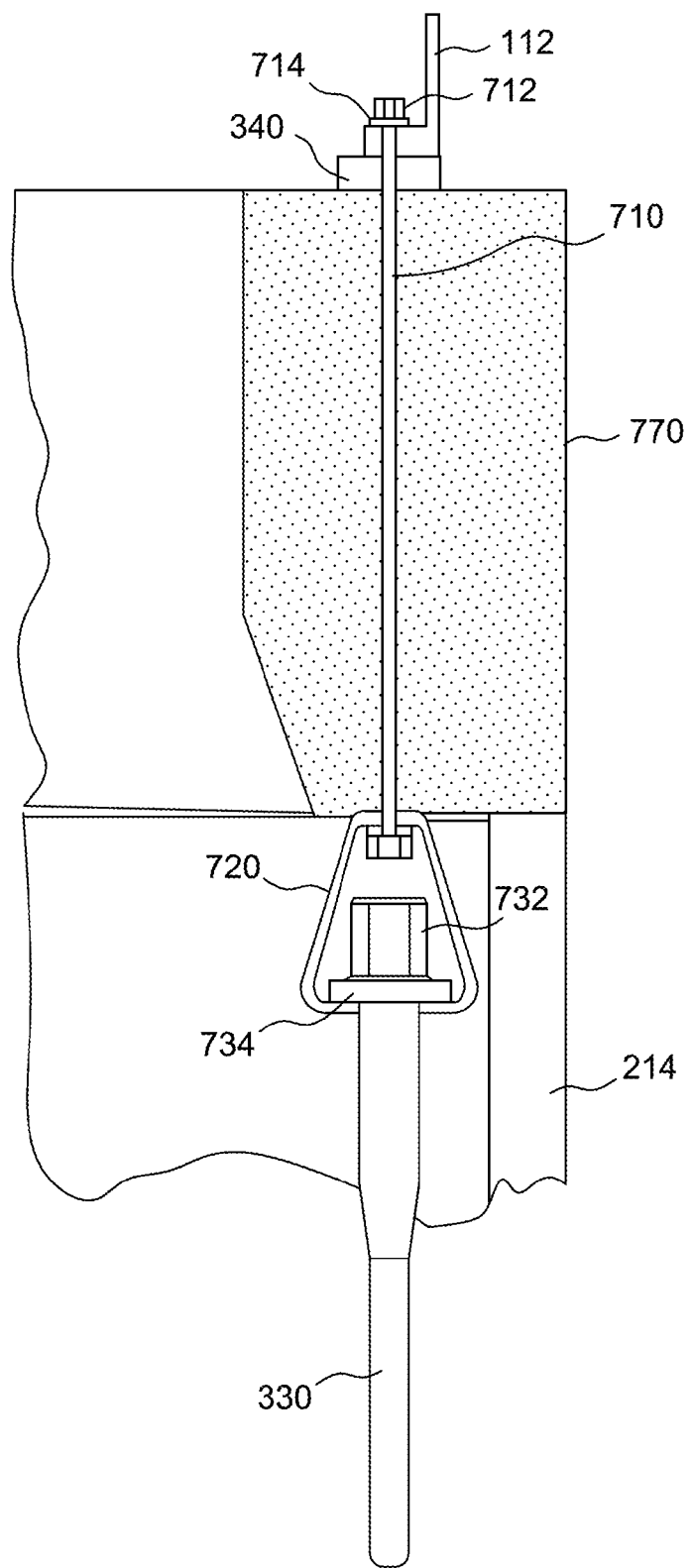
FIG. 7 illustrates a cross-sectional view of an adapter section, according to an aspect of the present invention.

FIG. 7 illustrates a cross-sectional view of an adapter 770, according to another aspect of the present invention. The link ring 720 is attached to the bottom of the adapter 770 with tower bolts 710. Similar to previous examples, the upper tower section 112 may be secured to the adapter via bolt plate 340, tower bolts 710, nuts 712 and washers 714. The cables 330 are secured to link ring 720 with suitable fastening means, such as nuts 732 and washers 734. The vertically aligned tower bolts 710 and cables 330 reduce any shear or tensile loads, and any subsequent cracking, experienced by the concrete in adapter 770.

Figure 8:
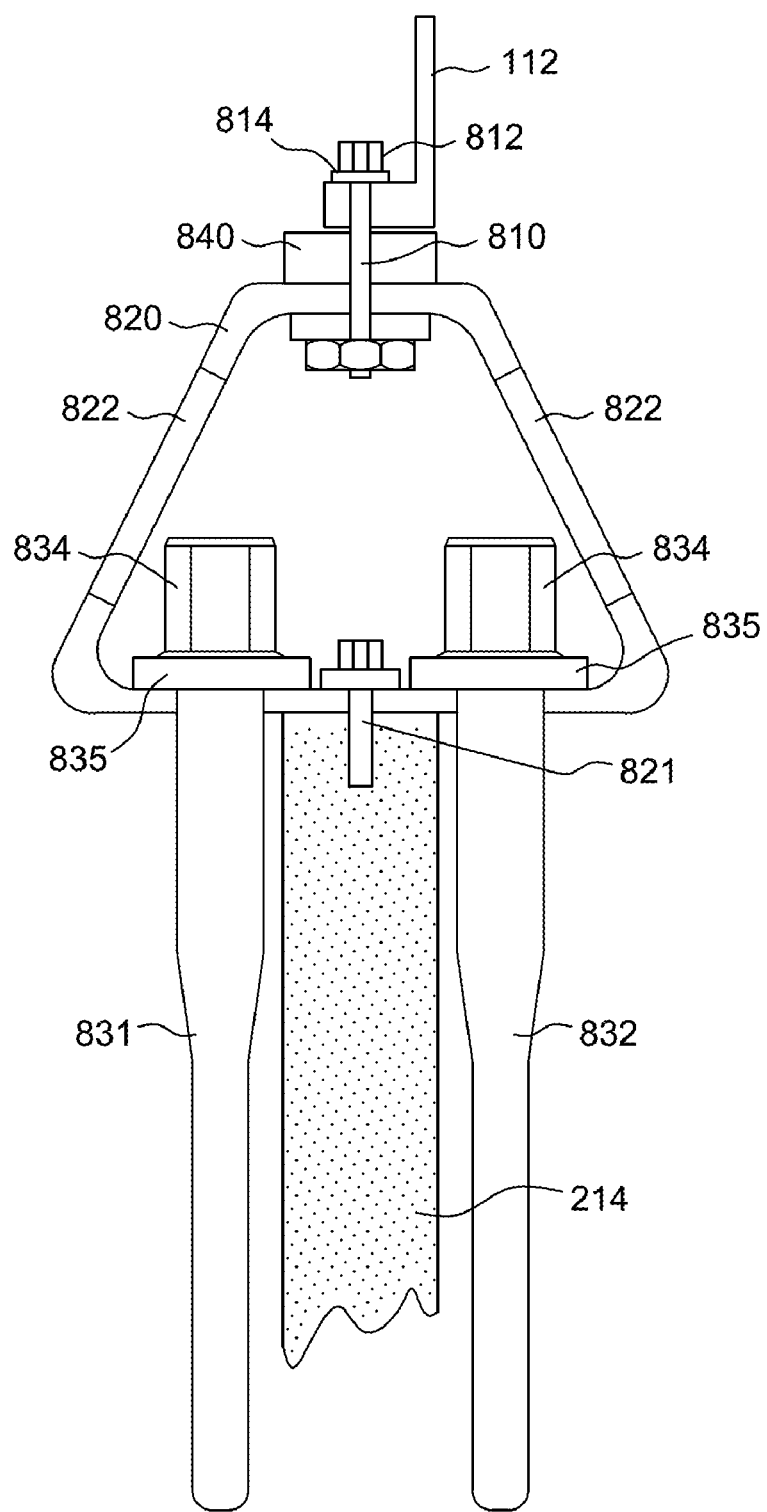
FIG. 8 illustrates a cross-sectional view of an adapter section, according to an aspect of the present invention.

FIG. 8 illustrates a link ring 820 that can be used to join an upper tower section 112 to a lower concrete section 214, according to another aspect of the present invention. The link ring 820 uses two sets of cables, where interior cables 831 are located inside concrete tower section 214 and exterior cables 832 are located external to concrete tower section 214. The upper ends of cables 831 and 832 may be threaded and secured to the link ring 820 with nuts 834 and washers 835, or any other suitable fastening means. The link ring may be attached to the concrete tower section with bolts 821 or any other suitable fastening means. The link ring 820 may be a substantially hollow member, a substantially solid member or may have solid sections, and may have any suitable cross-sectional profile, including but not limited to, trapezoidal (as shown), polygonal, cylindrical, I-shaped, oval or rectangular.

The upper tower section 112 may be attached to the link ring 820 by the use of bolt plate 840, tower bolts 810, nuts 812 and washers 814. The net forces of the cables 831 and 832 are vertically aligned with the tower bolts 810 to reduce any shear or tensile loads, and directly transmit load forces to concrete tower section 214. Windows 822 may be provided at various internal and/or external circumferential positions around link ring 820. In other aspects of the present invention, the bolts 810 may be welded on to link ring 820 and the upper portions of the bolt can be threaded to accept fasteners to attach upper tower section 112.

The tensioning cables 831 and 832 are located circumferentially around the concrete section 214, and may be positioned close to and at a substantially uniform distance from an outer and exterior surface of concrete section 214. In other words, the tensioning cables 831 and 832 can be parallel to or nearly parallel to the outer and inner surface of concrete section 214. As one non-limiting example only, the tensioning cables 831 and 832 may be spaced from an exterior or interior surface of a top portion of concrete section 214 by about two to twelve inches, whereas the cables 831 and 832 may be spaced from an exterior or interior surface of a bottom portion of concrete section 214 by about six to eighteen inches.

One advantage provided by the present invention is the reduction of the effective moment-arm on tower section 214. By positioning the tensioning cables 831 and 832 close to and on both sides (i.e., internal and external) of concrete section 214 the tower reduces its effective moment-arm to provide resistance to wind loads. In one aspect of the present invention, the cables 832 are located external to, but in close proximity to the tower walls. For example, a very small diameter tower having internal cables would need thicker walls and thicker cables to counteract the forces applied by the wind, when compared to a larger diameter tower having internal and external cables. The larger diameter tower could be made with thinner concrete walls and have smaller diameter cables when compared to the very small diameter tower.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tower comprising:
   a foundation;
   at least one concrete tower section located above the foundation;
   one or more upper tower sections;
   an adapter section located between the at least one concrete tower section and one of the upper tower sections, the adapter section connected to one of the upper tower sections by a fastening system and the adapter section connected to the foundation by a plurality of tensioning cables, the plurality of tensioning cables configured to induce a compressive force on the at least one concrete tower section, wherein the adapter section comprises a plurality of access ports, the plurality of access ports configured for permitting access to upper ends of the plurality of tensioning cables;
   wherein the fastening system and the plurality of tensioning cables are vertically aligned so that tower loads are transmitted from the one or more upper tower sections to the plurality of tensioning cables.

2. The tower of claim 1, the adapter section further comprising:
   at least one link ring;
   wherein the plurality of tensioning cables are connected to the at least one link ring.

3. The tower of claim 2, wherein the at least one link ring is embedded within the adapter section.

4. The tower of claim 2, wherein the at least one link ring comprises a plurality of windows, the plurality of windows permitting access to upper ends of the plurality of tensioning cables.

5. The tower of claim 2, wherein the at least one link ring has a cross-section profile of at least one of:
   trapezoidal, polygonal, cylindrical, oval, I-shaped, rectangular and C-shaped.

6. The tower of claim 1, wherein the adapter section is comprised of concrete.

7. The tower of claim 1, wherein the one or more upper tower sections are comprised of rolled steel.

8. The tower of claim 1, wherein the tower is a wind turbine tower.

9. A wind turbine having a tower, the tower comprising:
   a foundation;
   at least one concrete tower section located above the foundation;
   one or more upper tower sections;
   an adapter section located between the at least one concrete tower section and one of the upper tower sections, the adapter section connected to one of the upper tower sections by a fastening system and the adapter section connected to the foundation by a plurality of tensioning cables, the plurality of tensioning cables configured to induce a compressive force on the at least one concrete tower section, wherein the adapter section comprises a plurality of access ports, the plurality of access ports configured for permitting access to upper ends of the plurality of tensioning cables;
   wherein the fastening system and the plurality of tensioning cables are vertically aligned so that tower loads are transmitted from the one or more upper tower sections to the plurality of tensioning cables.

10. The wind turbine of claim 9, the adapter section further comprising:
    at least one link ring;
    wherein the plurality of tensioning cables are connected to the at least one link ring.

11. The wind turbine of claim 10, wherein the at least one link ring comprises a plurality of windows, the plurality of windows permitting access to upper ends of the plurality of tensioning cables.

12. The wind turbine of claim 9, wherein the at least one link ring has a cross-section profile of at least one of:
    trapezoidal, polygonal, cylindrical, oval, I-shaped, rectangular and C-shaped.

13. The wind turbine of claim 9, wherein the adapter section is comprised of concrete, and the one or more upper tower sections are comprised of rolled steel.

* * * * *